US007236575B2

(12) United States Patent
Kim et al.

(10) Patent No.: US 7,236,575 B2
(45) Date of Patent: *Jun. 26, 2007

(54) SYSTEM AND METHOD FOR IP BANDWIDTH TRADING

(75) Inventors: Roger Kim, Ashburn, VA (US); Michael Gibbs, Manassas, VA (US); Alexander Mashinsky, New York, NY (US)

(73) Assignee: Arbinet-thexchange, Inc., New Brunswick, NJ (US)

( * ) Notice: Subject to any disclaimer, the term of this patent is extended or adjusted under 35 U.S.C. 154(b) by 632 days.

This patent is subject to a terminal disclaimer.

(21) Appl. No.: 10/671,315

(22) Filed: Sep. 25, 2003

(65) Prior Publication Data

US 2004/0042596 A1    Mar. 4, 2004

Related U.S. Application Data

(63) Continuation-in-part of application No. 09/368,828, filed on Aug. 5, 1999, now Pat. No. 6,912,277, which is a continuation-in-part of application No. 09/213,703, filed on Dec. 17, 1998, now Pat. No. 6,144,727, which is a continuation-in-part of application No. 09/129,413, filed on Aug. 5, 1998, now Pat. No. 6,226,365, and a continuation-in-part of application No. 08/927,443, filed on Sep. 11, 1997, now Pat. No. 6,005,926, which is a continuation-in-part of application No. 08/920,567, filed on Aug. 29, 1997, now abandoned.

(60) Provisional application No. 60/413,355, filed on Sep. 25, 2002.

(51) Int. Cl.
*H04M 15/00* (2006.01)

(52) U.S. Cl. .................. 379/114.07; 379/114.12; 379/115.01; 370/352

(58) Field of Classification Search ........... 379/111, 379/112.01, 112.09, 114.01, 114.05, 114.06, 379/114.07, 114.08, 114.12, 115.01, 115.03; 370/352–354; 705/7, 20, 22
See application file for complete search history.

(56) References Cited

U.S. PATENT DOCUMENTS

2006/0178918 A1*   8/2006   Mikurak .................... 705/7

FOREIGN PATENT DOCUMENTS

DE          195 16 364          11/1995

\* cited by examiner

*Primary Examiner*—Binh K. Tieu
(74) *Attorney, Agent, or Firm*—Cohen Pontani Lieberman & Pavane LLP

(57) ABSTRACT

A method and system for trading IP bandwidth in an exchange environment. Participating members of the exchange register their IP route destinations with the exchange. The exchange collects buy and sell orders, which include parameters such as the desired destination, price and quality of the routes. The buy and sell orders are matched based on the specified parameters, and lists of matched orders are forwarded to members' routers for execution of the trades. The exchange settles the executed trades by issuing invoices in accordance with the buyer members' usage of the bandwidth offered by the seller members.

26 Claims, 3 Drawing Sheets

Sell Order
Destination Network Identifier
AS 22099
Price
$3 / Giga Bytes Transferred
Average Latency
20 mSec
Packet Loss
< 0.5%
Min Bandwidth Block
2000 Gbytes
Traffic Type
Pull
Delivery Period
May 1, 2003 - May 31, 2003
Order Type
On-Net
Protocol Type
UDP

*Fig. 3*

| Buyer Query | Seller Results | | | | | | | | | | |
|---|---|---|---|---|---|---|---|---|---|---|---|
| | Member | Price ($/Mbps) | AS Hop | Router Hop | Latency (mSec) | Packet Loss (%) | Available Capacity (in Mbps) | Min Bandwidth Commitment | Term (months) | Transit or On-net | Inter iEDP |
| Destination Network Identifier | AS 2914 | $110 | 2 | 8 | 35 | 0 | 150 | No | 1 | O | No |
| AS 22099 | AS 701 | $190 | 2 | 6 | 35 | 0 | 200 | 50 | 1 | T | No |
| Price | AS 1 | $100 | 2 | 6 | 35 | 0 | 500 | No | 1 | T | No |
| < = $190/Mbps | AS 3549 | $80 | 2 | 5 | 10 | 0.5 | 500 | No | 1 | T | No |
| Max AS Hop Count | AS 3561 | $150 | 2 | 6 | 20 | 0 | 150 | 50 | 1 | T | No |
| 2 | AS 7911 | $80 | 1 | 3 | 10 | 0 | 900 | 100 | 1 | T | No |
| Latency | AS 3356 | $90 | 1 | 2 | 8 | 0.5 | 300 | No | 1 | O | No |
| < 40 mSec | Tier 1 #02 | $190 | 1 | 2 | 30 | 0 | 600 | 50 | 6 | T | Yes |
| Packet Loss | AS 7018 | $110 | 1 | 2 | 8 | 0 | 800 | No | 1 | T | No |
| <1% | AS 22099 | $175 | 0 | 1 | 25 | 0 | 700 | No | 1 | O | Yes |
| Min Bandwidth Block | | | | | | | | | | | |
| 50 Mbps | | | | | | | | | | | |
| Traffic Type | | | | | | | | | | | |
| Push | | | | | | | | | | | |
| Delivery Period | | | | | | | | | | | |
| 1 Month | | | | | | | | | | | |
| Order Type | | | | | | | | | | | |
| All | | | | | | | | | | | |
| Protocol Type | | | | | | | | | | | |
| All | | | | | | | | | | | |

*Fig. 4*

SYSTEM AND METHOD FOR IP BANDWIDTH TRADING

CROSS-REFERENCE TO RELATED APPLICATIONS

The present application claims priority to an earlier filed provisional U.S. Application No. 60/413,355, filed Sep. 25, 2002 and is a continuation-in-part of application Ser. No. 09/368,828, filed Aug. 5, 1999 now U.S. Pat. No. 6,912,277, which is a continuation-in-part of application Ser. No. 09/213,703 (now U.S. Pat. No. 6,144,727), filed Dec. 17, 1998, which is a continuation-in-part of application Ser. No. 09/129,413 (now U.S. Pat. No. 6,226,365) filed Aug. 5, 1998; and application Ser. No. 08/927,443, (now U.S. Pat. No. 6,005,926) filed Sep. 11, 1997, which is a continuation-in-part of U.S. patent application Ser. No. 08/920,567, filed Aug. 29, 1997 now abandoned, all of which are incorporated herein by reference.

BACKGROUND OF THE INVENTION

1. Field of the Invention

The present invention relates to a system and a method for Internet Protocol (IP) bandwidth trading in an exchange environment.

2. Description of the Prior Art

The public Internet (the Internet) is a worldwide roughly hierarchical connection of Internet Service Provider (ISP) networks that are connected to millions of computer and computing devices. Each computer or computing device, i.e., end device, is connected to an ISP network. The interconnection of the ISP networks allows each ISP network to connect to a number of other ISP networks and define preferences for incoming and outgoing data traffic on these connections. The protocol used to support these interconnections is called Border Gateway Protocol (BGP).

The Internet access is bought from a single provider or multiple providers. These suppliers offer all IP routes to the customer. In some cases, a subset of all IP routes is sold, which could be known in the industry as paid peering, or partial transit. Another way to buy Internet access is from a reseller who aggregates and manages all its suppliers IP routes and redistributes all IP routes to the buyer. Other resellers allow the buyers to choose one specific supplier among a pool of suppliers. In this scenario, if the buyer wants multiple suppliers, the buyer must provision multiple connections to other suppliers.

SUMMARY OF THE INVENTION

The present invention provides, in a preferred embodiment, a method for trading bandwidth among members of a trading exchange system comprising a trading server, a trading arbiter and a trading switch. The trading arbiter collects IP address identifiers, such as IP prefixes, from trading member routers for facilitating the transmission of telecommunications traffic to certain routes of a trading member's network. The trading server receives from trading members buy orders and sell orders (i.e. bids and asks) for IP bandwidth. Each of the orders may include a destination network parameter, price and/or quality parameters, and the effective period of the bids and asks associated with a particular destination or route. The buy orders and sell orders are stored in an order database and are matched periodically according to specified business rules on the basis of one or more of these parameters. In one embodiment, a buying member may select one or more routes from a set of matched buy and sell orders, and update its routers using, for example, the border gateway protocol metrics or announcements so as to permit the transmission of IP or telecommunication traffic to the offered routes of the matched selling member's network.

Participating members must be set up before they can input buy orders and sell orders by connecting a member router of each participating member to the trading switch, and registering their routes with the trade route registry. The set-up also includes performing a route analysis of IP traffic through each of the member routers, and saving results of the route analysis in an IP quality database in the trading server. For settlement set-up and billing verification purposes, a specified sampling technique is used to determine the number of bits transmitted over a predetermined period between the trading switch and the member's router through the use of Autonomous System Number field or an IP prefix block under the BGP protocol. The set-up procedure may also include a member generating a list of the member's customer and/or externally known IP routes connected to the member's network and inputting them into the trading arbiter.

The trading arbiter will activate all new trades and revoke all expired buy or sell orders based on member trading transactions from the trading server. The updating of the BGP metrics or announcements for the member routers is based on information from the trading results received from the trading server.

The present invention also provides a system for trading IP bandwidth including a trading server and a trading arbiter connected to a switch. The switch is connectable to member routers for receiving buy and sell orders for IP bandwidth from the members. The trading server includes an IP trading platform for matching buy and sell orders, an order database for storing the buy and sell orders, and a quality parameter database for storing IP traffic profiles including quality characteristics of member networks determined by route analysis. Each of the buy orders and sell orders includes a destination network parameter and other suitable parameters, and said trading server matches buy orders and sell orders based on the destination network parameter and other specified parameters.

The trading server also includes an IP route optimization platform for matching buy and sell orders and a settlement platform for processing usage records based on port usage statistics for member billing. The trading arbiter may automatically arrange matched orders based on price/cost for a particular route or destination and send member router the routing information so as to minimize a member's efforts in the use of the trading system. Alternatively, a member may select, manually or automatically, one or more matched orders based on its preferred business rules or requirements.

The trading system of the present invention may be scalable such that separate trading systems can be operated independently or combined into a centralized trading system at a later time. In a centralized trading system, the trading servers of the separate trading systems may be connected to each other through their respective switches and the member routers are connected to each other through a dedicated link or network such that traffic may flow between networks of the separate trading systems.

BRIEF DESCRIPTION OF THE DRAWINGS

In the drawings:

FIG. 3 is a sample sell order; and

FIG. 4 is a sample buyer order and a list of seller results.

DETAILED DESCRIPTION OF THE PREFERRED EMBODIMENTS

Figure 1:
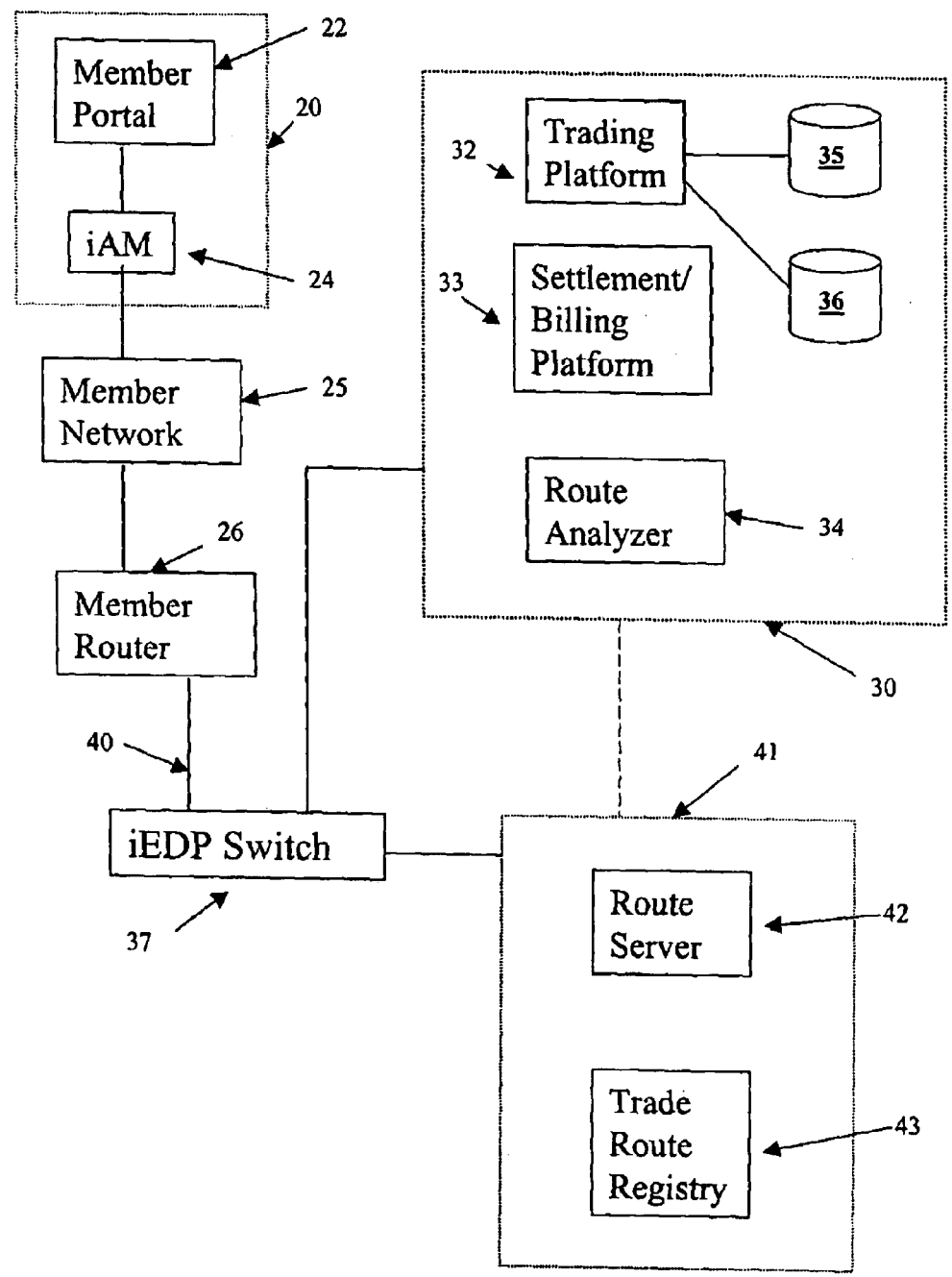
FIG. 1 is a schematic block diagram showing an IP bandwidth trading exchange connected to the connection of a trading server and trading switch to a member network.

FIG. 1 shows a block diagram of an exchange for bandwidth trading and routing of data traffic among members of the exchange. Preferably, the exchange members are IP service providers, which operate IP networks and desire to trade network capacities through the exchange. The exchange includes a bandwidth trading server 30 for processing and matching buy and sell orders (i.e. bids and asks) received via the Internet (or equivalent) from members and settling trading activities for its members, and a trading arbiter 41 for controlling traffic to and from member networks 25 based on results from the trading server 30, both of which are connected to an IP Exchange Delivery Point (iEDP) switch 37 such as, for example, a Layer-2 switch that supports IP protocol. The trading server 30 and the trading arbiter 41 may communicate with each other through a switch or directly through a link. A member end device 20, which may, for example, be a computer, is connected to the member network 25. Although the member end device 20 is shown as a separate device, it may also comprise a part of the member network 25 or may be several devices within a member network 25. Member network 25 is connected to member router 26 for routing telecommunications traffic to and from an iEDP switch 37, which is configured to switch traffic among various member networks. Preferably, the iEDP switch 37 is connected to the member router 26 through an interface 40 such as Ethernet or OC-n connection.

The trading server 30 includes a trading platform 32 for receiving buy and sell orders from members of the exchange, a settlement/billing platform 33, a route analyzer 34, a buy/sell order database 35, and a quality database 36. The trading arbiter 41 comprises a route server 42 and a trade route registry 43. The member device 20 includes a member trading portal 22 which provides an interface, i.e., an XML interface, for the member device 20 and a member IP access manager (iAM) 24. Each of the member trading portal 22 and the iAM 24 may comprise a software module within the member device 20 or a server-side module within the trading platform 32. While only one member device 20 and one member router 26 are shown in FIG. 1, many members will typically be connected to the iEDP switch 37, and each member may have a plurality of member routers and member devices.

Figure 2:
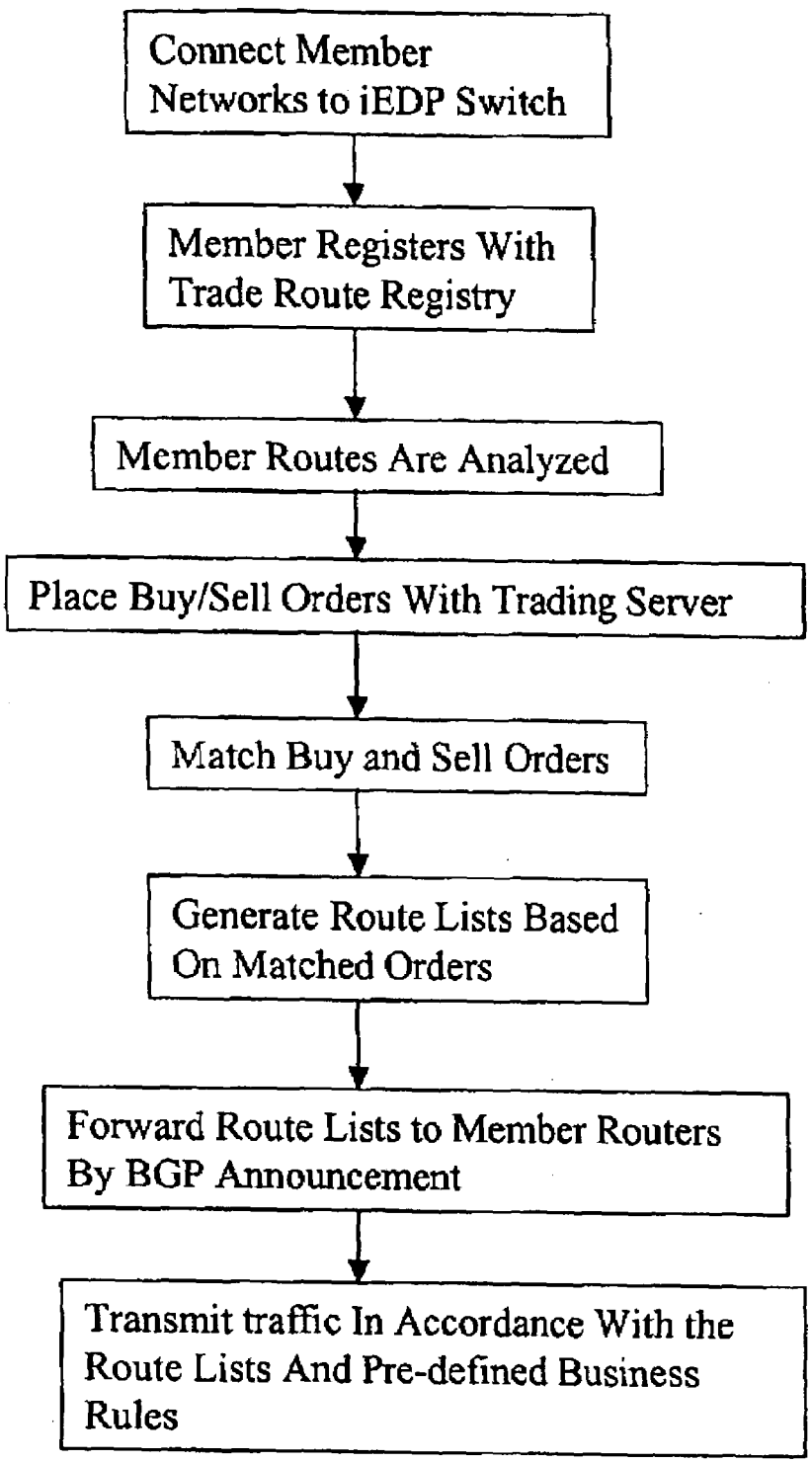
FIG. 2 is a basic flow diagram of the IP bandwidth trading process.

FIG. 2 is a flow diagram illustrating a preferred method of initializing a member network for IP bandwidth trading and processing of trading activities by the exchange system. Initially, each member desiring to buy or sell IP bandwidth performs a member setup or provision procedure during which member account and network information is gathered. Once a member is properly setup, the member can submit a buy and/or sell order to the trading server 30. The trading server facilitates the matching of buy and sell orders, and members may enter buy-sell relationships by accepting matches found by the trading server.

The member setup procedure first requires that members'0 routers be connected to the iEDP switch 37 by the interface 40. The members, buying or selling, then register their destination network parameters such as, for example, route prefixes and/or community strings (which identify their route destinations) with the trade route registry 43. A BGP session will then be brought up between a member router 26 and the route server 42. Preferably, a route analysis is then performed by the route analyzer 34 on the member network 26 to determine the quality characteristics of the member network 25. Such analysis may, for example, be performed by analyzing member IP prefixes received by the route server 42. The quality characteristics may include packet loss, packet latency, packet availability, and logical path and physical distance among routers in a member network, etc. The route server 42 also sends out control signals to other member routers via the iEDP switch 37 based on the trade results. The route analyzer 34 performs route analysis through the member router 26 using, for example, one or more test messages and the responses thereto. This route analysis may be performed during a predefined period such as, for example, a 24-hour period and uses marginally intrusive or non-intrusive sampling techniques known to the ordinary artisans. For buying members, the route analysis determines average volume of traffic (measured in, e.g., Mbps) to a specific destination as indicated by a destination network parameter, e.g., Autonomous System Number or IP prefix block, which is referred herein as a destination network parameter. This in turn assists the buying members in determining how much bandwidth should be bought through the exchange. As for selling members, the route analysis determines the quality characteristics of their networks. In one embodiment, each selling member may also register a list of customer IP address routes (and possibly web domains associated with the IP address) that are connected directly to their networks so that traffic may be routed to those customer IP address routes.

For all members, the route analysis determines quality parameters such as network latency, packet loss, network availability, router hops, Autonomous System (AS) hops, and others that indicate a member's IP network quality. The route parameters for each member are stored in the quality database 36, which is accessible by the trading platform 32. Two important parameters are network latency and packet loss. These parameters may be updated periodically, e.g., hourly, daily, weekly, or monthly to validate the quality of each members route. Other parameters may be optionally used.

The quality parameters may be measured using the tools used during route analysis by the iAM 24 and may be certified by third parties such as Keynote Systems, Gomez Networks, and Media Metrix or the trading server 30. These quality parameters may be used to create an optimized routing table for members to buy access to. This is done by the route analyzer 34 updating the route server 42 with a new BGP table containing an optimized set of IP prefixes or equivalent (i.e. destination network parameters which signify routes or destinations) for subscribing members. This will then be distributed by the route server 42 to the member router 26 if the member desires to obtain this optimized routing table.

Once a member is set up, the member may place buy and sell orders. Sell orders may be anonymous or identified by AS numbers. An example of the information in a sell order is shown in FIG. 3. Buy and sell orders may be manually input through the member trading portal 22, such as, for example by a member employee. Alternatively, iAM 24 may automatically input buy or sell orders based on actual or projected IP traffic flows or other business rules. Once a buy or sell order is sent to the trading server 30, it is stored in the order database 35 which may be centralized as shown in FIG. 1 or decentralized (i.e., distributed such that separate order databases may be linked to each other to form a virtual single database). The parameters which may appear in the buy and sell orders are as follows:

Destination Network Identifier/Parameter—This field identifies the network destination that is being sold or bought. This field can be anonymous for Transit sellers. The field code can be either IP address or AS number.

Price—This field indicates the bid that the seller is willing to accept or ask that the buyer is willing to pay. For example, the price may be $/Mbps using 90% or 95% usage rating mechanism. The price may optionally be $/Bytes transferred for streaming applications. If the order is for multicast traffic, it could be priced per session or stream.

Average Latency—This is a quality parameter that the seller guarantees on its network. It is the average latency across all links on its entire network. A standard industry definition may be used.

Packet Loss—This is a quality parameter that the seller guarantees on its network for the duration of IP traffic delivery. A standard Internet industry definition may be used.

Minimum Bandwidth Block—This quantifies the size of the bandwidth block that is being sold or bought by the member. This parameter may be quantified as Mbps, Giga Bytes, or number of multicast streams.

Traffic Type—The buyer or seller identifies the type of traffic in this field. The field code can be "push" for content, "pull" for access, or bidirectional for transit or on-net settlement peering.

Delivery Period—The delivery period is the duration that the seller or buyer guarantees the transaction. This may be as short as a day, depending on the traffic sold. However, it may include any duration such as weekly or monthly.

Order Type—This field describes the type of order in terms of On-net paid peering or settlement peering, or Transit order.

Protocol Type—In some cases, a data descriptor is necessary to define the type of traffic that will be passed. This will be useful for streaming and multicast applications. Initially, the field may be defaulted to all protocols.

Once buy and sell orders are entered, the trading platform 32 matches the buy and sell orders and provide a list of matching orders. All members that are properly set up can query and view what IP address blocks and AS numbers are participating at the trading server 30. The IP trading platform 32 performs IP route matching by matching each buy and sell order using parameters entered in the buy and sell orders and predefined business rules. The primary parameters used for matching are destination network identifier/parameter, price, quality, and available capacity. Of course other parameters may be used as requested by the member. FIG. 4 is an example of a buyer order and a list of matching seller results. The buyer can choose to be matched directly with the desired destination network (if possible) or be routed indirectly through another network. Furthermore, a member may select a matching order based on route optimization or quality. Alternatively, the member may also want to take cost into consideration. In the latter case, the iAM 24 performs a heuristic calculation to determine a cost and performance combination factor using the order database and the customer-specific route analysis. This combination factor depends on member preference, as well as other internal network cost information, which may include individual components of Internet access such as cross-connect charges, local loop charges, intercity/long-haul capacity costs, upstream Internet access charges, and others that the member may want to input manually, or automatically. In this mix of potential sellers selected by iAM 24, there may be both on-net and transit networks. If any on-net network is unreachable or has poor performance for any reason, the iAM 24 can provide alternate route control information from the route optimization platform 34 to re-configure the router so that the next best possible path is available. To fix this problem, it will use one of the multiple transit providers that the buyer has already established a BGP session. If one of the transit networks is having a problem, the iAM 24 provides dynamic route control information to reconfigure the router, using BGP metrics such as local preferences, weights, etc. The router reconfiguration can be performed manually by an engineer, or dynamically by integrating iAM 24 with the router through a command line script interface.

When a buyer and a seller agree to a buy-and-sell relationship, the available port capacity of each of the buyer and seller members is adjusted in the order database 35 and the quality database 36. The route server 42 generates a route plan based on the trade results. This is done by creating BGP metrics using a baseline set of metrics established by the route server 42 and using the buy and sell trade results. Each member can then define and set parameters for new BGP metrics to be applied by modifying the current set of BGP configurations based on the BGP announcements from the route server 42. The route plan may be in the form of a table or computed by an algorithm based on member data and trade results.

The BGP announcements are distributed to member router 26 automatically based on the route plan. Route control information may then be exchanged between the route server 42 and the iAM 24. Any changes in the BGP announcements are reviewable before member's execution of the route plan. For stability purposes, all member BGP route updates will be executed in a predefined interval.

The configuration of the member router 26 may be modified manually by member engineers, or reconfigured automatically by iAM 24. Member routers 26 provide IP traffic flow data and a BGP table or algorithm to iAM 24. Each member may then operate its own member router 26 and set its own BGP policies by using the iAM 24.

A member router agent (not shown) may be software or hardware that communicates with the route analyzer 34. This device may be a client server technology or it can be independent and distributed in nature. In the preferred embodiment, this function will be in software form and will reside in iAM 24. The member router agent collects the BGP table from a member router 26 for comparison with other members by the route optimization platform 34. The member router agent also gathers member IP traffic profile and network performance of other members who have established BGP session. It gathers statistics on how much and where the traffic flows in and out of the router. This provides input to the member for IP route matching. Second, the network quality of all members who have active BGP sessions through a Layer-2 switch, or possibly a multiple BGP policies capable router, is also measured. This information is necessary for quality update and certification of each member destination IP routes.

The settlement/billing platform 33 collects usage statistics from the iEDP switch 37 for the member's specific port for both paper and on-line billing purposes. Both buyer and seller usage statistics are collected to ensure accuracy of member usage data. Usage information is rated according to a matched order. Third party standard or proprietary software may be used to collect and bill usage for each member. In a bilateral arrangement, settlement is between the user and seller. However, in an exchange environment, a selling member may not know the buying member and must outsource the billing to the exchange. In general, usage data may be used to calculate usage fees for each member. The settlement platform 33 may generate trading reports as well as invoices for buyers and sellers.

Each member may be required to produce a satisfactory credit report and the credit management of the member will be dependent on the results of the credit report. For example, when a member has an unsatisfactory credit history, it may be required to prepay two months worth of estimated buying activities. Also, when a buying member's net buying activities exceeds its credit limit, the trading server may refuse to accept and/or execute buying activities from the buying member.

It is contemplated that two or more IP bandwidth trading exchanges may be connected to each other to form a single virtual exchange by, for example, an optical multiplexer or other intra-exchange wide-area-network (WAN) connections. That is, a first trading server may be connected to member routers in a first internet exchange and a second trading server may be connected to member routers in a second internet exchange. The second trading server may comprise an IP trading platform having an order database for saving the buy and sell orders and an IP quality database for saving IP traffic profiles of members determined by route analysis, each of the buy orders and sell orders including a destination network parameter. The first trading server may match buy and sell orders based on the destination network parameter from its own order database and the order database in the second trading server Thus, while fundamental novel features of the invention as applied to preferred embodiments have been described, it will be understood that various omissions, substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for trading IP bandwidth in an exchange system comprising a trading server and a trading arbiter connected to a trading switch, said method comprising the steps of:
    a. registering one or more destination network parameters of each member's network with a trade route registry, accessible by the trading arbiter, in order to facilitate the identification of a member's routes.
    b. receiving, at the trading server, buy orders and sell orders from respective buying and selling members for IP bandwidth and storing the buy orders and sell orders in an order database, each of the orders including a destination network parameter;
    c. matching buy and sell orders based on the destination network parameter and generating a list of one or more matched buy and sell orders as a trading result; and
    d. communicating by the trading server the trading result to the matched buying and selling member networks using border gateway protocol announcements so that said matched buying and selling member networks may configure their routes between the matched buying and selling members.

2. The method of claim 1, further comprising the step of settling the bandwidth trades between members based on usage of the bandwidth by a buyer member.

3. The method of claim 1, wherein each of the orders includes further parameters comprising price, quality, and capacity, said step of matching comprises matching buy and sell orders based on each of the parameters.

4. The method of claim 1, wherein said each of the orders includes further parameters comprising type of IP address prefixes to buy, said type of IP address prefixes being customer, peer, transit or specific IP address prefixes, and said step of matching comprises matching buy and sell orders based on each of the parameters.

5. The method of claim 1, further comprising the step of setting up participating members before said step of receiving buy orders and sell orders by connecting a member router of each participating member to the trading switch connected to the trading server, performing a route analysis of IP traffic through each of the member routers, and saving results of the route analysis in a quality database accessible by the trading server.

6. The method of claim 1, wherein said step of performing route analysis includes analyzing test messages sent through member networks.

7. The method of claim 2, wherein said step of trade settlement comprises using a sampling technique for a sampling period to determine number of bits per second sent from a buying member's network to a destination in a selling member's network.

8. The method of claim 5, wherein said step of setting up comprises generating a list of customer IP routes connected to a network of a member when the member is a seller and giving the list, via an external gateway protocol, to the trading arbiter for storage and recall.

9. The method of claim 1, wherein said step of generating a list of one or more matched buy and sell orders as a trading result further comprises verifying, by the trading server, buyer port capacity at a switch connected to the trading server and adjusting the available port capacity of the buyer and seller.

10. The method of claim 5, wherein said step of performing a route analysis comprises periodically validating the quality of the network of each member using quality measurement by one of a third party and the trading server and updating the quality database as required.

11. The method of claim 1, wherein each of the orders includes further parameters comprising price, average latency, packet loss, network distance, minimum bandwidth block, traffic type, delivery period, order type, member ID, and protocol type.

12. The method of claim 1, wherein said step of matching comprises matching buy and sell orders based on at least one of optimal performance and price.

13. The method of claim 12, wherein said step of matching comprises matching buy and sell orders based on a combination of optimal performance and price selected by the member.

14. The method of claim 12, wherein said step of matching comprises matching buy and sell orders based on optimized performance only.

15. The method of claim 1, wherein said step of updating comprises updating border gateway protocol announcement for the member routers of the members by the member in response to information about the trading result received from the trading arbiter.

16. The method of claim 7, further comprising the step of collecting usage statistics from a member network so as to compare actual usage information to the usage information of the trading result.

17. An exchange system for trading IP bandwidth, comprising a trading server connected to a switch, said switch being connectable to member routers for receiving buy and sell orders for IP bandwidth from the member routers of members, said trading server comprising a trading platform having an order database for storing the buy and sell orders and a quality database for storing quality characteristics of member networks determined by route analysis, each of the buy orders and sell orders including a destination network parameter, and said trading server generating trades by matching buy orders and sell orders based on the destination network parameter; and a trading arbiter to register and store member IP address prefixes of the member routers and to implement the trades.

18. The system of claim 17, wherein said trading server further comprises a route analyzer for determining network prefix quality for each of the matched buy and sell orders.

19. The system of claim 17, wherein said trading server further comprises a settlement platform for billing based on usage statistics of the members.

20. The system of claim 17, wherein said trading server further comprises a trade order platform for receiving, storing, and matching the buy and sell orders.

21. The system of claim 17, wherein said trading arbiter comprises a route server for receiving and distributing destination network parameters to members for the trades using BGP.

22. The system of claim 17, wherein said trading arbiter further comprises a trade route registry for registering and storing all IP routes announced by the members and their routing policies.

23. The system of claim 17, further comprising at least one member router connected to said switch, said member router connected to a member device including an access manager and an interface between said member device and said switch, said interface transmitting said buy and sell orders to the trading server, wherein said buy order and sell orders are one of manually input to said interface and automatically generated by said access manager.

24. The system of claim 23, wherein said member router is for a buyer member, said trading server comprising means for determining a list of matching sell orders in the order database which meet the destination address parameter of the buy order of the buyer member, said access manager comprising means for selecting a sell order from the list of matching sell orders based on at least one of performance and price.

25. The system of claim 24, wherein said means for selecting comprises means for selecting a sell order from the list of matching sell orders based on performance and price.

26. The system of claim 17, wherein the trading server comprises a first trading server connectable to member routers in a first internet exchange, said system further comprising a second trading server connectable to member routers in a second internet exchange, said second trading server comprising a trading platform having an order database for saving the buy and sell orders and a quality database for saving IP traffic profiles of members determined by route analysis, each of the buy orders and sell orders including a destination network parameter, wherein said first trading server matches buy and sell orders based on the destination network parameter from its own order database and the order database in said second trading server.

* * * * *